United States Patent
Yamana

[15] 3,652,925
[45] Mar. 28, 1972

[54] POLYPHASE TRANSFORMER DEVICE WHOSE TAPS ARE CHANGEABLE WHEN LOADED

[72] Inventor: Masaki Yamana, Kawasaki, Japan

[73] Assignee: Fuji Denki Seizo Kabushiki Kaisha, Kawasaki-shi, Japan

[22] Filed: Nov. 30, 1970

[21] Appl. No.: 93,705

[30] Foreign Application Priority Data

Nov. 28, 1969 Japan..................................44/95517

[52] U.S. Cl. ..............................323/43.5 R, 323/47, 323/48
[51] Int. Cl............................................................G05f 3/04
[58] Field of Search......................323/43.5 R, 45, 47, 48, 60

[56] References Cited

UNITED STATES PATENTS

| | | | |
|---|---|---|---|
| 3,252,079 | 5/1966 | Dortort | 323/45 |
| 3,239,749 | 3/1966 | Oriez | 323/43.5 R |
| 2,883,612 | 4/1959 | de Buda | 323/47 X |
| 3,374,426 | 3/1968 | Bedil | 323/45 |

Primary Examiner—A. D. Pellinen
Attorney—Holman & Stern

[57] ABSTRACT

A polyphase regulating transformer device has a main transformer, a tertiary winding in the main transformer and a series transformer with its secondary winding connected in series with the output of the main transformer. The tertiary winding is connected to excite the primary of the series transformer, and is itself composed of a fixed winding section and a tapped winding section both being connected in series at a neutral point through a tap changer; the primary phase windings of the series transformer are not provided with any interphase connections and are insulated from one another. A condenser bank is connected for power factor improvement across terminals of the fixed winding section of the tertiary.

2 Claims, 2 Drawing Figures

INVENTOR
Masaki Yamana

BY Holman & Stern
ATTORNEYS

POLYPHASE TRANSFORMER DEVICE WHOSE TAPS ARE CHANGEABLE WHEN LOADED

BACKGROUND OF THE INVENTION

The present invention relates to a polyphase regulated transformer device whose taps are changeable when loaded, said transformer device comprising a main transformer and a series transformer, wherein the primary windings of the series transformer are respectively excited by the tertiary windings of the main transformer and the secondary of the series transformer is connected respectively in series with the secondary winding of the main transformer.

Such a transformer device as mentioned above in which the tertiary windings of the main transformer and the primary winding of the series transformer are Y-connected, is commonly known. Also, such a transformer device as mentioned above, in which each of the tertiary windings of the main transformer is divided into a fixed winding and a tapped winding, said fixed winding being connected to a neutral point on one side and said tapped winding on the other and in which the primary windings of the series transformer are respectively connected to be excited by tapped ends of said tertiary windings through respective tap changers, is well known.

In addition, it is known in this type of the transformer device as mentioned above that with purpose of improving power factor, a capacitive load device is connected in parallel across either a part or the whole of each of the tertiary windings of the main transformer. Such a capacitive load device is generally connected in parallel across said fixed windings arranged at a neutral point side to avoid a large variation in capacitive load capacity, said variation being due to voltage adjustment.

However, in the above-mentioned commonly known transformer device, the tap changers, each of which is arranged for each phase, have considerable voltage differences therebetween and also with respect to a neutral point thereof. Accordingly, in order to obtain a necessary insulation strength, the tap changers become complicated in construction, large in dimension, and thereby high in cost.

In order to overcome such disadvantages as mentioned above, an arrangement has been suggested in which the tapped winding involved in the tertiary winding of the main transformer is arranged at the neutral end while the fixed winding is arranged on the other end of said tapped winding, thereby to use a tap changer for forming a neutral point. By this arrangement, the above-mentioned disadvantages of the tap changers being extensive may be eliminated, but the arrangement requires that two terminals for connection of a capacitive load device of a fixed capacitance be provided per phase, and further the capacitive load devices themselves have voltage difference therebetween and with respect to the neutral point. Consequently, the arrangement has similar disadvantages as found in the case of the above-mentioned tap changers.

SUMMARY OF THE INVENTION

An object of the present invention is to provide a polyphase transformer device whose taps are changed when loaded, which is low in manufacturing cost.

Another object of the present invention is to provide a polyphase transformer device whose taps are changed when loaded, which can employ tap changers for selectively forming a neutral point and a capacitive load device of a fixed capacitance for connection at a neutral point.

These objects can be achieved, according to the present invention, by that fixed windings and tapped windings of the tertiary windings of a main transformer are connected in series at the neutral point of the fixed windings through tap changers, primary windings of a series are not provided with any interphase connections and are electrically insulated from one another, and said primary windings of the series transformer are excited by the tertiary windings of the main transformer.

The above-mentioned and other objects and features of the present invention will be better understood from the following description taken in connection with the accompanying drawings, in which same or equivalent members are indicated by the same reference characters and numerals.

DETAILED DESCRIPTION OF THE PRESENT INVENTION

Figure 1:
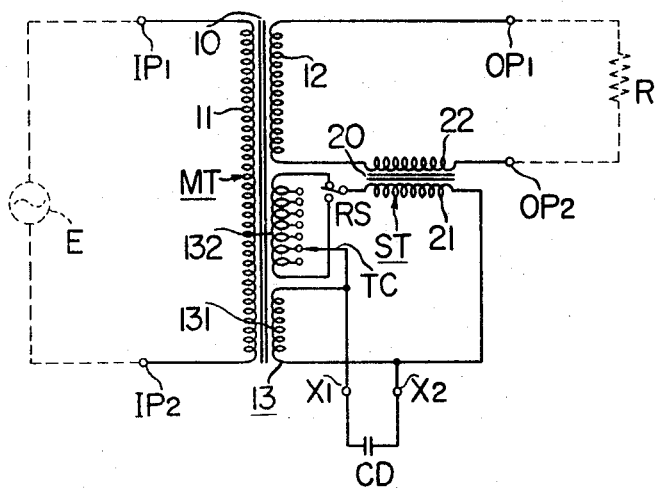
FIG. 1 is a connection diagram showing one phase of a polyphase arrangement according to the present invention.
Figure 2:
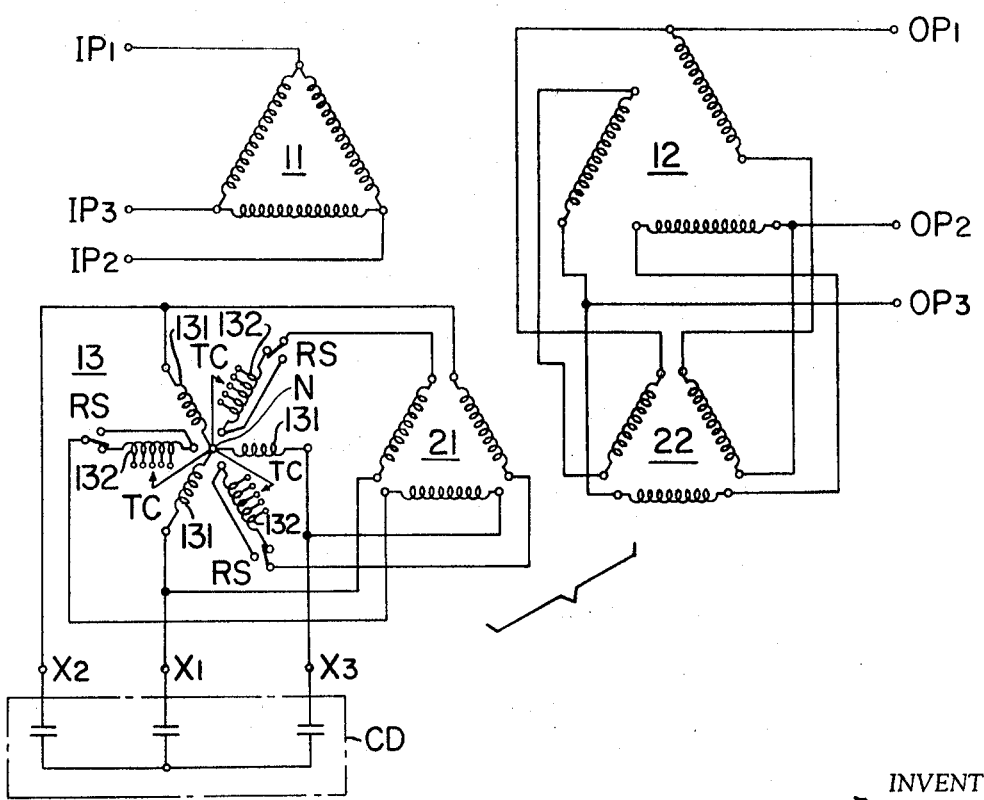
FIG. 2 illustrates diagrammatically a three-phase arrangement of a preferred embodiment according to the present invention.

With reference to FIG. 1, a main transformer MT is provided with a primary winding 11, a secondary winding 12 and a tertiary winding 13 comprising a fixed winding 131 and a tapped winding 132, all windings being wound on a first common iron core 10. A series transformer ST has a primary winding 21 and a secondary winding 22, both being wound on a second common iron core 20. The secondary winding 22 of the series transformer ST is connected in series with the secondary winding 12 of the main transformer MT, and its output terminals $OP_1$ and $OP_2$ are connected to a load R. Terminals $IP_1$ and $IP_2$ of the main transformer MT are the input terminals of the transformer device and are connected to an electric power source E. Referring to FIG. 2 which diagrammatically illustrates a three-phase arrangement embodying the invention, terminals $IP_1$, $IP_2$ and $IP_3$ of the main transformer are input terminals and are connected to a power source. Terminals $OP_1$, $OP_2$ and $OP_3$ are connected to a load. The fixed winding 131 and the tapped winding 132 of the tertiary 13 of the main transformer MT are connected in series with each other through a tap changer TC, and further both open ends of the windings thus series connected are further connected to the primary winding 21 of the series transformer ST. In the connection shown in FIG. 1, a reversing switch RS is provided between the primary winding 21 and the tapped winding 132 thereby to substantially increase the number of taps. A capacitive load device CD for power factor improvement is connected to the terminals $X_1$, $X_2$ and $X_3$ which are extended from both ends of the fixed winding 131. As apparent from FIG. 2, fixed windings 131 have a neutral point N and further tapped windings 132 possess the neutral point N in common as formed by the connections of tap changers TC. On the other hand, the primary windings 21 are not made as a three-phase connection on the series transformer and are electrically insulated from one another. Further, any end of the windings 21 is not connected directly to the neutral point N of the tertiary windings 13.

The fixed windings 131 of the tertiary windings 13 of the main transformer are Y-connected at the neutral point N, and also the tap changers, each of which is for each phase, are Y-connected at the neutral point. Therefore, these tap changers compose a three-phase device for setting the neutral point; and, since the potential difference between them is small, it is not necessary to make the insulation strength relatively high even in the case of using three sets of single-phase devices, whereby the tap changers can be manufactured to be low in cost. Moreover, the capacitive load device CD with three terminals for three phases can be connected to the terminals extended respectively from the opposite neutral side of the fixed windings 131. The terminal voltage of the capacitive load device CD is not changed even by changing the tap of the tapped windings 132 at all. In addition, a capacitive load device which is low in cost, can be employed as described for the tap changer.

The neutral point N of the above device may be used in the grounded state or non-grounded state, depending upon the conditions of the electric power source. The above description relates to the case of an embodiment for three phases. However, it is will be obvious that the present invention is not limited thereto, but can be applied to polyphase devices of a number of phases other than three phases. Moreover, the primary windings of the main transformer may be connected in Y or delta connection. The secondary load circuit of the regulated transformer device may be used by connecting each phase to its respective different load, or alternatively may be used as a Y-connection or a delta-connection.

I claim:

1. In a polyphase regulated transformer device comprising:
   a polyphase main transformer having a primary winding, a secondary winding, and a tertiary winding with each of its phase windings composed of a fixed winding section and a tapped winding section;
   a series polyphase transformer with its primary windings individually connected to be excited by said tertiary windings of the main transformer, the secondary windings of said series transformer being connected in series with respective secondary phase-windings of the main transformer for changing an output voltage of the secondary winding of the main transformer;
   and on load tap changing means to effect tap changing on said tapped winding section while the regulated transformer device is carrying load, the improvement comprising:
     means connecting said fixed winding sections to form a neutral point;
     means connecting said tapped winding sections through said on load tap changers to form a neutral point coincident with the first said neutral point; and
     means connecting each of the phase windings of the tertiary winding, which are formed by a series connection of each of said tapped winding sections with its corresponding fixed winding section, with an isolated and insulated phase of the primary winding of the series transformer.

2. In a polyphase regulated transformer device comprising:
   a polyphase main transformer having a primary winding, a secondary winding, and a tertiary winding with each of its phase windings composed of a fixed winding section and a tapped winding section;
   a series polyphase transformer with its primary windings individually connected to be excited by said tertiary windings of the main transformer, the secondary windings of said series transformer being connected in series with the respective secondary phase windings of the main transformer for changing an output voltage of the secondary winding of the main transformer;
   a capacitor device means connected for power factor compensation;
   and on load tap changing means to effect tap changing on said tapped winding section while the regulated transformer device is carrying load, the improvement comprising:
     means connecting said fixed windings section to form a neutral point;
     means connecting said tapped winding sections through said on load tap changers also to form a neutral point coincident with the first said neutral point;
     means connecting each of the phase windings of the tertiary winding, which are formed by a series connection of each of said tapped winding sections with its corresponding fixed winding section, with an isolated and insulated phase of the primary winding of the series transformer;
     and means connecting said capacitor device means across those terminals of said fixed winding sections which terminals are away from the neutral point.

* * * * *